United States Patent [19]

Pottick et al.

[11] Patent Number: 5,369,167
[45] Date of Patent: Nov. 29, 1994

[54] MELT BLENDING ACID OR ANHYDRIDE-GRAFTED BLOCK COOPLYMER PELLETS WITH EPOXY RESIN

[75] Inventors: Lorelle A. Pottick; David J. St. Clair, both of Houston, Tex.

[73] Assignee: Shell Oil Company, Houston, Tex.

[21] Appl. No.: 218,494

[22] Filed: Mar. 28, 1994

Related U.S. Application Data

[62] Division of Ser. No. 448,192, Dec. 8, 1989.

[51] Int. Cl.$^5$ ............ C08L 51/06; C08L 63/02; C08L 63/04
[52] U.S. Cl. ............................. 525/65; 523/436
[58] Field of Search ............ 525/65, 179, 194, 198, 525/207

[56] References Cited

U.S. PATENT DOCUMENTS

| | | |
|---|---|---|
| Re. 27,145 | 7/1971 | Jones . |
| 2,450,940 | 10/1948 | Cowan et al. . |
| 2,633,458 | 3/1953 | Shokal . |
| 3,231,635 | 1/1966 | Holden et al. . |
| 3,265,765 | 8/1966 | Holden et al. . |
| 3,322,856 | 5/1967 | Holden et al. . |
| 3,336,241 | 8/1967 | Shokal . |
| 3,494,942 | 2/1970 | Miki et al. . |
| 3,634,549 | 1/1972 | Shaw et al. . |
| 3,670,054 | 6/1972 | De La Mare et al. . |
| 3,700,633 | 10/1972 | Wald et al. . |
| 3,892,819 | 7/1975 | Najvar . |
| 3,948,698 | 4/1976 | Elrick et al. . |
| 4,014,771 | 3/1977 | Rosenkranz et al. . |
| 4,033,888 | 7/1977 | Kiovsky . |
| 4,077,893 | 3/1978 | Kiovsky . |
| 4,119,609 | 10/1978 | Allen et al. . |
| 4,141,847 | 2/1979 | Kiovsky . |
| 4,292,414 | 9/1981 | Saito et al. . |
| 4,308,353 | 12/1981 | Saito et al. . |
| 4,391,949 | 7/1983 | St. Clair . |
| 4,431,782 | 2/1984 | Harris et al. . |
| 4,444,953 | 4/1984 | St. Clair . |
| 4,507,411 | 3/1985 | Gordon et al. . |
| 4,578,429 | 3/1986 | Gergen et al. . |
| 4,707,529 | 11/1987 | Hoffman et al. . |
| 4,786,668 | 11/1988 | Dewhirst . |

FOREIGN PATENT DOCUMENTS

| | | |
|---|---|---|
| 0078527 | 5/1983 | European Pat. Off. . |
| 58-17160 | 2/1983 | Japan . |
| 63-308027 | 12/1988 | Japan . |

*Primary Examiner*—Robert E. Sellers

[57] ABSTRACT

An epoxy resin adhesive composition is provided, and a process to prepare this composition. The composition comprises: a modified hydrogenated block copolymer comprising at least one polymeric block containing predominantly monoalkenyl aromatic hydrocarbon monomer units and at least one polymeric block, prior to hydrogenation, containing predominantly conjugated diolefin monomer units. The modified hydrogenated block copolymer being modified with from 2 to about 200 anhydride or dicarboxylic acid groups per modified hydrogenated block copolymer molecule. The functionality is incorporated substantially into that portion of the polymer containing predominantly conjugated diolefin monomer units. The epoxy resin-modified block copolymer blend is held under high shear mixing under conditions sufficient to react an amount of the modified hydrogenated block copolymer functional groups with epoxy groups effective to provide a stable dispersion of the modified hydrogenated block copolymer in the epoxy resin. A curing agent such as an aromatic polyamine is then added.

19 Claims, No Drawings

MELT BLENDING ACID OR ANHYDRIDE-GRAFTED BLOCK COOPLYMER PELLETS WITH EPOXY RESIN

This is a division of application Ser. No. 07/448,192, filed Dec. 8, 1989, now allowed.

BACKGROUND

This invention relates to a polymeric composition and a method for preparing this composition. More particularly, this invention relates to an epoxy adhesive composition having excellent shear adhesion to metallic substrates and a method for preparing this composition.

Epoxy resins are, of course, well known in the prior art. These resins have a spectrum of properties that are well adapted for use in molding compositions, coatings, adhesives, fiber reinforced laminates, composites, engineering plastics and various speciality applications such as potting resins and mortars. Included in this spectrum of properties are good corrosion and solvent resistance, good adhesion, good electrical properties, good dimensional stability, hardness, low shrinkage on cure and many other beneficial properties. Unfortunately, however, epoxy resins suffer a major disadvantage in that the epoxy resins are, generally, undesirably brittle.

Several attempts have been made to produce an epoxy resin composition retaining or at least substantially retaining the desirable epoxy resin properties while reducing the brittleness or improving the impact resistance thereof. Early attempts to accomplish this objective involved dissolving a reactive liquid polymer such as a carboxyl-terminated butadiene-acrylonitrile copolymer into an epoxy prepolymer as discussed in the background sections of U.S. Pat. No. 4,707,529 and Japanese Patent (Kokai) No. SHO 58[1983]-17160. As indicated in the background section of '529, incorporation of the reactive liquid polymer led to the formation of discrete elastomer particles or domains which, upon cure, toughened the epoxy resin. As is now known, however, the resulting composition will exhibit a lower softening temperature and a lower glass transition temperature than the unmodified epoxy resin. Also, while improved mechanical properties, particularly toughness, are generally obtained, it is difficult to control the extent and consistency of the improvement. This result is apparently due to the difficulty of controlling the morphology of this particular composition.

Another attempt to improve the toughness of compositions comprising polyepoxides with liquid polymers is also discussed in '529. In this second process, liquid acrylate rubbers are incorporated into epoxy resin compositions for the purpose of improving the composition's impact resistance without adversely affecting desirable properties. Such compositions are the subject of European Patent Application No. 78,527. The acrylate rubbers are, however, generally, soluble in the polyepoxide continuous phase at temperatures above about 51° C. and in some cases even at room temperature. As a result, undesirable softening of the cured epoxy resin composition can readily occur. In addition, it is again difficult to control the size of the particles of the dispersed modifying phase, and hence, the morphology of the cured composition. This is because the polymeric phases do not separate until the epoxy cures, and the dissolving and reprecipitation of these phases are sensitive to the manner in which the curing takes place.

Another attempt to improve polyepoxide compositions involved the incorporation of a normally solid, selectively hydrogenated, modified block copolymer in the composition. The block copolymer contained at least one aromatic vinyl compound polymer block and at least one hydrogenated conjugated diolefin polymer block. The polymer was modified by grafting dicarboxylic acid or carboxylic acid derivative (e.g. anhydride) functionality into the conjugated diolefin polymer blocks. Such compositions are taught in Japanese Patent (Kokai) No. 58[1983]-17160 and Application Publication No. 57[1982]-149369.

Japanese Application Publication '369 teaches an adhesive composition comprising 100 parts by weight of a carboxylic acid modified block copolymer of a conjugated diolefin and a vinyl arene; and 5 to 100 parts by weight of an epoxy resin. The method and apparatus for mixing the component is said to be not critical, and examples are described where the epoxy resin and modified block copolymer are mixed by kneading for 15 minutes at 120° C.

The compositions of '369 are high in rubber content and would not exhibit properties generally associated with polyepoxide compositions to any great extent. The compositions of '369 could be characterized as epoxy crosslinked modified block copolymers, which differ from the epoxy-modified block copolymer compositions which have continuous epoxy phases. Also, epoxy curing agents are not utilized because the epoxy functions in these compositions to crosslink the modified block copolymers, and the epoxy groups are not then available for subsequent curing.

A heat curable epoxy composition is taught in Japanese Application '160. The heat curable epoxy composition comprises a resin selected from a group which includes epoxies, and a carboxylic acid modified block copolymer of a conjugated diolefin and a vinyl arene. The examples in '160 are prepared by mixing 100 parts by weight of an epoxy with 10 parts by weight of a modified block copolymer. The modified block copolymer was freeze pulverized to a size of 80 mesh or less. The mixture was then mixed at 150° C. for 30 minutes. Applicant has found that adhesive compositions of 10% modified copolymers in 90% epoxies which had been prepared by mixing freeze pulverized modified block copolymers into the epoxy had lap shear strengths (as measured by ASTM 1002 using an anodized aluminum substrate) which were not significantly greater than lap shear strengths of epoxy compositions without modified copolymers. For adhesive applications, the process of preparing the epoxy-modified block copolymer compositions taught in '160 is therefore not advantageous. Incorporation of polymers of this type into an epoxy resin composition did, according to the disclosure of '160, further improve the impact resistance as represented by the notched Izod impact strength.

Still another method of improving epoxy compositions is taught in '529. In this particular method, an epoxy resin composition comprising a dispersion of siloxane polymers and a polyepoxide is provided. At least a portion of the siloxane polymer is actually grafted to the epoxy resin. These compositions exhibit improved impact resistance and improved thermal and mechanical properties. The epoxy resin must, however, be modified to facilitate the grafting reaction. This, then, could adversely affect the desired properties of the polyepoxide. Moreover, a cocatalyst is required to effect at least certain of the necessary reactions in this process.

Since epoxy resins are well adapted for a broad range of uses, particularly adhesive compositions, the lap shear strength could be increased without significant loss of any of the desirable properties of the epoxy resin including the thermal properties thereof, particularly on a consistent, controllable basis, and since the prior art methods designed to accomplish this objective have not been completely successful the need for an improved method or composition to accomplish this objective is believed to be readily apparent. It is particularly desirable to provide an epoxy-elastomeric block copolymer composition wherein the elastomer domains form stable dispersions prior to curing of the epoxy so the size and shapes of the domains are not significantly effected by the curing conditions.

SUMMARY OF THE INVENTION

It is an object of this invention to provide an epoxy resin composition having improved lap shear adhesion. In another aspect, it is object of this invention to provide a process for preparing such a composition that will facilitate consistent control thereof.

In accordance with the present invention, the foregoing and other objects and advantages are accomplished by melt mixing 100 parts by weight of an epoxy resin, and from 1 to 100 parts by weight of pellets of a modified selectively hydrogenated block copolymer comprising at least one polymeric block comprising predominantly monoalkenyl aromatic hydrocarbon monomer units and at least one polymeric block comprising, before hydrogenation, predominantly conjugated diolefin monomer units where the modification comprises functional groups grafted substantially to the block comprising predominantly diolefin monomer units, and the functional units are selected from the group consisting of carboxylic acid, carboxylic acid derivatives and combinations thereof. The melt comprising these components is then held under conditions of high shear mixing at an elevated temperature for a time sufficient to form an effective amount of ester reaction product of the epoxy groups with the acid or acid derivative functionality of the block copolymer, the effective amount being effective to result in a stable dispersion of modified hydrogenated block copolymer in the uncured epoxy resin. The block copolymers are modified by incorporating the carboxylic acid or acid derivative groups substantially completely into the polymer blocks initially containing predominantly conjugated diolefin monomer units at a level of, on the average, between 2 and about 200 functional groups as dicarboxylic acid or anhydride per modified block copolymer molecule. The composition may further comprise any of the curing agents known to be useful in curing epoxy resin compositions. The composition will be prepared by a process whereby the modified hydrogenated block copolymer or copolymers are dispersed, but not molecularly dissolved, in the epoxy resin, and the nature of the rubber phase is determined by the initial blending process—not the curing process. Consistency and controllability will be insured by reacting an effective amount of the acid or acid derivative groups of the modified hydrogenated block copolymer with the epoxy groups of the epoxy resin.

DETAILED DESCRIPTION OF THE INVENTION

The present invention relates to an epoxy resin composition comprising an epoxy resin and a carboxylic acid or acid derivative modified selectively hydrogenated block copolymer comprising at least one polymeric block containing predominantly monoalkenyl aromatic hydrocarbon monomer units and at least one polymeric block containing, before hydrogenation, predominantly conjugated diolefin monomer units, the modified hydrogenated block copolymer and epoxy resin having been mixed under conditions of high shear at an elevated temperature for a time sufficient for epoxy groups to react with an effective amount of the acid or acid derivative functionality of the modified block copolymer.

Any of the epoxy resins known in the prior art to be useful in epoxy resin compositions may be used in the epoxy resin composition of this invention. Suitable epoxy compounds include compounds containing, on average, two or more pendant or terminal 1,2-epoxy group; i.e., reactive epoxy group, per molecule. Suitable epoxy compounds may be saturated or unsaturated, aliphatic, cycloaliphatic, aromatic or heterocyclic and may be substituted, if desired, with non-interfering substituents such as halogen atoms, hydroxyl groups, ether radicals and the like.

Suitable epoxy compounds may also be liquid or solid at standard temperature and pressure. Normally liquid epoxy prepolymers are preferred because normally solid epoxy prepolymers are difficult to effectively blend with modified hydrogenated block copolymers. By normally liquid, it is meant that the resins are liquid at room temperature and by normally solid, it is meant that the resins are solid when at room temperature.

Examples of useful epoxy resins include polyglycidyl ethers of polyhydric alcohols and polyhydric phenols; polyglycidyl amines, glycidiated aminophenols, polyglycidylamides, polyglycidylimides, polyglycidylhydantoins, polyglycidyl isocyanuates, polyglycidylthioethers, epoxidized fatty acids or drying oils, epoxidized polyolefins, epoxidized diunsaturated acid esters, epoxidized unsaturated polyesters, and mixtures thereof. Useful epoxy resins also include the epoxidized cycloolefins; as well as the polymeric polyepoxides which are polymers and copolymers of such monomers as glycidylacrylate, glycidylmethacrylate and allylglycidyl ether. Epoxy resins useful in the compositions of this invention may initially contain ethylenic unsaturation and may be slightly or partially crosslinked before use in the compositions of this invention. Epoxy resins useful in the epoxy resin composition of this invention are described, for example, in U.S. Pat. Nos. 3,804,735; 3,892,819; 3,948,698; 4,014,771; 4,119,609 and 4,786,668, which are incorporated herein by reference. Useful epoxy resins prepared from polyhydric phenols are described in such publications as U.S. Pat. No. 4,431,782, which is incorporated herein by reference. As indicated in this patent, epoxy resins can be prepared from mono-, di- and trihydric phenols and include the Novolac resins. Epoxy resins prepared with the hydrogenated phenols as taught in U.S. Pat. No. 3,336,241, which is incorporated herein by reference, may also be used.

A preferred epoxy resin has the general formula:

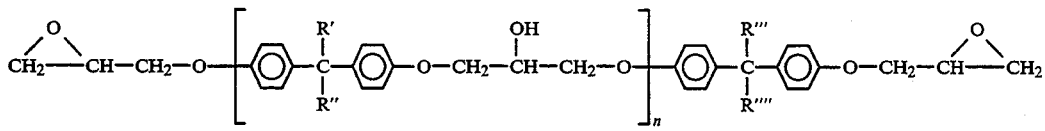

wherein:

n is a number from 0 to about 6, and

R', R", R''' and R'''' are independently selected from the group consisting of hydrogen and $C_1$ to $C_5$ alkane radicals.

Mixtures of epoxies which have an average value of n between 0 and 1 are most preferred. An epoxy mixture having an average n of about 0.2 is particularly preferred. Methyl, ethyl, isobutyl, and hydrogen are preferred as R', R", R''' and R'''', with methyl being most preferred.

Epoxy compounds and particularly those of the polymeric and prepolymer type, are frequently described in terms of epoxy equivalent values. The meaning of this expression is described in U.S. Pat. No. 2,633,458, which is incorporated herein by reference. The epoxy compounds useful in the present invention will have epoxy equivalent values greater than 1.

The epoxy compounds useful in the epoxy resin compositions of this invention will have average molecular weights within the range from about 50 to about 10,000 and preferably within the range from about 150 to about 2000. The epoxy equivalent weights or weight per epoxide useful in this invention range from about 90 to about 2000 and preferably from about 150 to about 1000.

While the invention is applicable to epoxy compounds generally, preferred epoxy compounds are glycidyl polyethers of polyhydric phenols such as bisphenol A and bisphenol F. These polyepoxides are usually made by reacting at least 2 moles of an epihalohydrin or glycerol dihalohydrin with one or more moles of a polyhydric phenol or one or more moles of a polyhydric phenol condensation compound. The products are characterized by the presence of more than 1 epoxy group; i.e., a 1,2-epoxy equivalency greater than 1.

The epoxide compounds used in the epoxy resin compositions of this invention may contain a minor amount of a monoepoxide, such as butyl glycidyl ether, phenol glycidyl ether or cresol glycidyl ether as a reactive diluent. Such reactive diluents are commonly added to epoxide formulations to reduce the working viscosity thereof and to give better wetting to the formulation. Inclusion of a monoepoxide affects the stoichiometry of the polyepoxide formulation and adjustments are made in the amount of curing agent and other parameters to reflect that change.

Any block copolymer comprising at least one polymeric block containing predominantly monoalkenyl aromatic hydrocarbon monomer units and at least one polymeric block containing, before hydrogenation, predominantly conjugated diolefin monomer units may be selectively hydrogenated, modified by incorporating 2 to 200 carboxylic acid or acid derivative (preferably dicarboxylic acid anhydride) groups, as dicarboxylic acid or acid anhydride, substantially into the blocks initially containing predominantly conjugated diolefin monomer units and used in the epoxy resin composition of this invention. The block copolymer may be linear, branched, coupled or radial because the invention does not depend on any specific geometrical structure, but rather on the chemical constituents of each of the polymer blocks. The block copolymer may be produced by any block polymerization procedure including sequential addition of monomer techniques; incremental addition of monomer techniques; or various coupling techniques. Tapered copolymer techniques may also be used.

Linear block copolymers useful in the epoxy resin composition of this invention include linear block copolymers such as those described in U.S. Pat. Nos. 3,231,635; 3,265,765 and 3,322,856, which are incorporated herein by reference. In general, linear and branched block copolymers which may be hydrogenated and functionalized and then used in the epoxy resin composition of this invention include those that may be represented by the general formula:

wherein:

A is a linear or branched polymeric block comprising predominantly monoalkenyl aromatic hydrocarbon monomer units;

B is a linear or branched polymeric block containing predominantly conjugated diolefin monomer units;

x and z are, independently, a number equal to 0 or 1; and y is a whole number ranging from 1 to about 20.

Radial block copolymers which may be hydrogenated and functionalized and then used in the epoxy resin composition of this invention include polymers of the type described in U.S. Pat. Nos. 4,033,888; 4,077,893; 4,141,847; 4,391,949 and 4,444,953, which are also incorporated herein by reference. Coupled and radial block copolymers which may be hydrogenated and functionalized and then used in the epoxy resin composition of this invention include those that may be represented by the general formula:

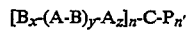

wherein:

A, B, x, y and z are as previously defined;

n and n' are, independently, numbers from 1 to about 40 such that $n+n'>3$;

C is the core of the coupled or radial polymer formed with a polyfunctional coupling agent having two or more functional groups; and each P is the same or a different polymer block or polymer segment having the general formula:

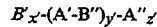

wherein:

A" is a polymer block containing predominantly monoalkenyl aromatic hydrocarbon monomer units which may be the same or different from A;

B' is a polymer block containing predominantly conjugated diolefin monomer units which may be the same or different from B;

A'-B" is a polymer block containing monoalkenyl aromatic hydrocarbon monomer units (A') and conjugated diolefin monomer units (B"), the A'-B" monomer units may be random, tapered or block and when each of A' and B" is blocked, the A' block may be the same or different from A" and B" may be the same or different from B';

x' and z' are, independently, numbers equal to 0 or 1; and y' is a number from 0 to about 20, with the proviso that the sum of x' plus y' plus z' is greater than or equal to 1.

The coupled and radial polymer may, then, be symmetric or asymmetric.

For convenience, the linear, branched, coupled and radial polymers which may be hydrogenated and functionalized and then used in the epoxy resin composition of this invention will, sometimes, herein be referred to as base block copolymers.

Polymeric blocks of the modified hydrogenated block copolymer may be either homopolymer, random or tapered copolymer blocks as long as each block predominates in at least one class of the monomers characterizing the blocks defined herein before. Thus, monoalkenyl aromatic blocks may comprise styrene/alpha-methylstyrene copolymer blocks or styrene/butadiene random or tapered copolymer blocks as long as the blocks individually predominate in monoalkenyl aromatics. The term "monoalkenyl aromatic" will be taken to include particularly those of the benzene series such as styrene and its analogs and homologs including alpha-methylstyrene and ring alkylated styrenes, particularly ring-methylated styrenes, and other monoalkenyl polycyclic aromatic compounds such as vinyl naphthalene and the like. The preferred monoalkenyl aromatics are styrene and alpha-methylstyrene, and styrene is particularly preferred.

The polymeric blocks comprising conjugated diolefin may comprise homopolymers of conjugated diene monomers, copolymers of two or more conjugated dienes, and copolymers of one of the dienes with a monoalkenyl aromatic as long as the block is predominately comprised of conjugated diene units. The conjugated dienes preferably contain from 4 to 8 carbon atoms. Examples of suitable conjugated diene monomers include: butadiene, isoprene, 2,3-dimethyl-1,3-butadiene, and piperylene, preferably butadiene and isoprene.

As used herein in connection with polymer block composition, the recitation predominantly shall mean that the specified monomer or monomer type shall constitute at least about 85 wt % of the total monomer content of said block.

The base block copolymers of conjugated dienes and monoalkenyl aromatics which may be utilized in this invention include any of those materials which have 1,2-microstructure contents prior to hydrogenation of from about 7% to about 100%, preferably from about 25 to about 65%, more preferably 35 to 55%. Such block copolymers may contain various ratios of conjugated dienes to monoalkenyl aromatics. The proportion of the monoalkenyl aromatic blocks in these block copolymers is between about 2 and about 60 weight percent and preferably between about 5 to about 40 percent by weight. When the monoalkenyl aromatic content is not more than about 60 percent by weight the precursor block copolymer has the characteristics of a thermoplastic elastomer.

The average molecular weights of the individual blocks may vary within certain limits. In most instances, the monoalkenyl aromatic blocks will have number average molecular weights in the range of about 1,000 to about 125,000, preferably about 1,000 to about 60,000, while the conjugated diene blocks either before or after hydrogenation will have number average molecular weights in the range of about 10,000 to about 450,000, preferably about 10,000 to about 150,000. These molecular weights are most accurately determined by gel permeation chromatography and/or low angle light scattering techniques.

Selective hydrogenation of the polymer may be accomplished using any of the methods known in the prior art. The hydrogenation will preferably be accomplished using a method such as those taught in U.S. Pat. Nos. 3,494,942; 3,634,594; 3,670,054; 3,700,633 and Re 27,145, which are incorporated herein by reference. Most preferably, selective hydrogenation will be accomplished using one of the processes taught in U.S. Pat. No. 3,700,633. These hydrogenation processes involve the use of a suitable catalyst, particularly a catalyst or catalyst precursor comprising an iron group metal compound. In the methods described in the foregoing patents, the catalyst is prepared by combining an iron group metal, particularly a nickel or cobalt compound with a suitable reducing agent such as an aluminum alkyl. The preferred iron group metal compounds are carboxylates and alkoxides.

The base block copolymer will be hydrogenated, preferably selectively hydrogenated, so as to convert (hydrogenate) at least about 80% of the ethylenic unsaturation initially contained therein without hydrogenating a significant amount of the aromatic unsaturation contained therein. The ethylenic unsaturation is preferably reduced to less than 10 percent of original ethylenic unsaturation and most preferably reduced to less than 2 percent of original ethylenic unsaturation. Aromatic unsaturation is preferably reduced by less than 10% of original aromatic unsaturation by the selective hydrogenation.

Selectively hydrogenated polymers containing residual ethylenic unsaturation may be modified with a carboxylic acid or anhydride simply by heating the polymer in the presence of an alpha-beta ethylenically unsaturated carboxylic acid or anhydride. The carboxylic acid may be monofunctional such as, for example, acrylic, methacrylic, cinnamic, crotonic, isocrotonic, mesaconic, and α-methylmesaconic. Polyfunctional, particularly difunctional acid functionality may alternatively be utilized, such as, for example, maleic, fumaric, iraconic, and citraconic. Additional examples of such monomers are given in Shiraki et al. U.S. Pat. No. 4,628,072 which is incorporated herein by reference. Mixtures of monomers can also be added so as to achieve grafted chains containing at least two different monomers therein (in addition to the base polymer monomers). Modification may be accomplished thermally or with the use of free radical initiators. Grafting via a thermal addition reaction may, of course, involve a mechanism which includes thermally produced free radicals. Grafting with a free radical mechanism is taught, for example, in U.S. Pat. No. 4,578,429, which is incorporated herein by reference. Incorporation of the carboxylic acid or anhydride groups via this technique may, however, result in cleavage of the polymer backbone with the carboxylic anhydride group or groups being incorporated at the end of one or more of the cleaved segments.

Free radical grafting may be accomplished in solution or in a molten state. When the polymer is processed in the molten state, however, means capable of imparting high mechanical shear, such as an extruder, will generally be used to effect the desired reaction to incorporate the functional group.

While all of the methods described above can be used to effect functionalization of the block copolymer useful in the epoxy resin composition of this invention when residual unsaturation is present in the conjugated diolefin polymer, functionalization of the polymer via grafting through a free radical mechanism such as that taught in U.S. Pat. No. 4,578,429 is preferred. This preference is due primarily to the fact that residual ethylenic unsaturation in the conjugated diolefin frequently will be minimal after hydrogenation is complete.

The level of functionalization required to provide the benefits of this invention is, on the average, between about 2 and about 200 functional groups, as anhydride or dicarboxylic acid per polymer molecule. Preferably, from 2 to about 40 functional groups per polymer molecule are utilized and more preferably from 5 to 20 functional groups per polymer molecule are utilized. It has been found that lower levels of functionality, although effective for toughening of a cured epoxy resin composition are not sufficient to provide improved shear adhesion when the composition is used as an adhesive. Higher levels of functionality, although possibly useful in epoxy resin compositions, are difficult to obtain without excessively degrading the polymer.

The preferred modifying ethylenically unsaturated carboxylic acid or anhydrides for functionalization of the hydrogenated block copolymer are polycarboxylic-containing species having from 2 to 10 carbon atoms with at least one olefinic unsaturation and anhydrides thereof. Alpha-beta unsaturated dicarboxylic acids and anhydrides thereof are more preferred and maleic acid and maleic anhydride are most preferred.

In general, the modified block copolymer will be contained in the epoxy resin composition of this invention at a concentration within the range from about 1 part by weight to about 100 parts by weight per 100 parts by weight of epoxy resin, preferably from about 5 part to about 35 parts by weight and most preferably from 5 to 25 parts by weight.

Modified hydrogenated block copolymers and the epoxy resin are combined utilizing melt blending techniques wherein the polymers are blended at a temperature at which the modified block copolymer is softened and using equipment capable of imparting a high level of mechanical shear. Examples of equipment suitable for melt mixing include Silverson mixers; mixing rollers; Banbury mills; kneaders; sigma blade mixers; and the like, as well as single or multiple screw extruders. It is important that the modified, selectively hydrogenated block copolymer initially be in a pellet form, the pellets having an average diameter within the range from about 0.05 to about 0.3 in. and preferably within the range of from about 0.05 to about 0.15 in.

A required step in the process of the present invention is the formation of an effective amount of an epoxy-acid or epoxy-acid derivative reaction product. This reaction product is preferably formed by elevating the temperature of the epoxy resin-modified hydrogenated block copolymer composition while the mixture is being agitated by high shear mixing, although formation at ambient temperatures is possible if an appropriate catalyst is utilized. Applicant has found that this reaction product will form and most of the acid functionality of the modified block copolymer will be reacted after the mixture is held at a temperature of 150° C. for 15 minutes and then at 190° C. for 30 minutes. Longer time periods at lower temperatures could also be sufficient, and the use of a catalyst for the reaction formation could decrease the time and/or the temperature requirements. Reaction times as long as one hour at temperatures above 150° C. may be required for high levels of conversion of anhydride to ester bonds.

The epoxy acid or acid derivative reaction product is an ester. The existence of this reaction product can therefore be determined by infrared (IR) absorption at a wavelength of about 1740 cm$^{-1}$ which is characteristic of ester functionality. Before formation of the reaction product, the modified block copolymer will typically have a strong absorption at 1710 cm$^{-1}$ which is characteristic of carboxylic acid functionality, and the absorption at 1710 cm$^{-1}$ will decrease or disappear after the epoxy-modified block copolymer mixture has been agitated at an elevated temperature.

The IR absorption may be measured with the components in a neat liquid state, or in solution with any suitable solvent. When measuring IR absorption of blends of epoxy resins and modified block copolymers, it is helpful to utilize a technique of digital subtraction of the spectrum of the epoxy from that of the blend. This enhances the features of the modified block copolymer.

It has been found that a small IR absorption characteristic of ester functionality is apparent in mixtures of epoxy resins and modified block copolymers which have been blended and held at room temperature, but the existence of a significant absorption characteristic of acid functionality indicates that the esterification does not go to completion without the aid of increased temperature or the aid of a catalyst.

Complete reaction between the block copolymer functionality and epoxy groups is not required. Sufficient comparability between the epoxy and the modified hydrogenated block copolymer for formation of a stable dispersion may be achieved with less than complete reaction of the block copolymer functionality. By stable dispersions, it is meant that the uncured epoxy compositions do not separate into a visible modified hydrogenated block copolymer phase and an epoxy rich phase upon standing at room temperature for one week. An amount of reaction between the block copolymer functionality and epoxy groups which is effective to achieve stable dispersions is also effective to achieve excellent lap shear adhesion properties. As used herein, an "effective" amount of reaction between the epoxy groups and the modified hydrogenated block copolymer functionality refers to an amount effective to create a suspension which is a stable dispersion. It is most preferred that substantially all of the block copolymer functionality is reacted with epoxy groups, because this serves to further increase the phase stability of the modified hydrogenated block copolymer uncured epoxy resin composition. By substantially all, it is meant that more than 80 percent of the initial block copolymer acid or acid derivative functionality is reacted with epoxy groups.

Another requirement of the process of the present invention is that the epoxy resin-modified block copolymer blend be held under high shear mixing while the epoxy groups react with the carboxylic acid or carboxylic acid derivative functionality of the modified block copolymer. This is due to crosslinking resulting from epoxy groups from one resin molecule reacting with functional groups from two or more block copolymer molecules. The mechanical deformation of the modified hydrogenated block copolymer pellets during this reaction will therefore determine the size of the block copolymer particles present in the uncured product and hence, the rubber particle size in the cured epoxy composition.

The severity of high shear mixing is related to the particle size of modified hydrogenated block copolymer formed in the epoxy composition. High shear mixing sufficiently severe to form dispersed modified hydrogenated block copolymer particles of 10 microns or less in number average particle diameters is preferred. High shear mixing sufficiently severe to form particles of 2 microns or less in number average particle size is more preferred.

Any of the curing agents known to be effective for curing an epoxy resin composition may be optionally incorporated into the composition of this invention. As is well known, the curing agent actually selected can influence the cure rate, the exotherm encountered during curing and the resultant properties of the cured product. As is well known, suitable curing agents are hydrocarbon compounds containing nitrogen, sulfur or oxygen atoms. Suitable curing agents may be aliphatic, cycloaliphatic or aromatic and generally will contain a plurality of nitrogen, sulfur or oxygen atoms. Polyamines and polyamides are particularly effective curing agents. Suitable polyamines include ethylenediamine, diethylenetriamine, homologues thereof and the like, diaminocyclohexane and homologues thereof, sulfur substituted analogues thereof and the like, and aromatic polyamines such as diaminodiphenylsulfone and the like. Suitable polyamides include those derived from polymeric fatty acids and aliphatic polyamines such as taught in U.S. Pat. No. 2,450,940, which is herein incorporated by reference. Latent curing agents such as borontrifluoride complexes and dicyandiamide may also be used.

The preferred curing agent is selected from the group consisting of diaminodiphenylsulfone, methylenedianaline, diaminotoluene and mixtures thereof.

Preferably, an amount of curing agent within the range of 75% of stoichiometric amount to about 150% of stoichiometric amount will be used, stoichiometric amount being an equal amount of curing agent functional groups and epoxy groups. More preferably an amount within the range of a 100 to 130% of stoichiometric amount will be used, and most preferably about 125% of a stoichiometric amount of curing agent will be used in the epoxy resin composition of this invention.

In addition to the essential components previously identified, the epoxy resin composition of this invention may contain other components such as fillers, reinforcement flakes or fibers, mats or webs, pigments, flame retardant agents, plasticizers, stabilizers, extenders, antioxidants, promoters, accelerators, thixotroping agents and the like. Other end use applications requiring one or more of these additional compounds are well known in the prior art and each such additional component will be used at concentrations well known to be effective for an intended purpose.

The epoxy composition made by the process of this invention may be utilized in adhesive and molding end use applications, both of which are well known for epoxy resin compositions. Due to the excellent lap shear strength of this composition, after curing, the product of the process of this invention is an excellent adhesive for many substrates. The existence of the paraffinic rubbery matrix within the block copolymer additive results in excellent adhesion of the epoxy composition to oily steel substrates in particular. The epoxy composition of this invention, after curing, also has excellent fracture toughness and good retention of performance in hot-wet environments. Desirable characteristics of cured epoxy resins, such as high glass transition temperature, are retained by the epoxy resin of this invention, after curing.

EXAMPLES

In these examples, properties were determined using the following test procedures:

Lap Shear Properties—ASTM D-1002. Anodized aluminum was used as a substrate with a 1" width, ½" lap and ±5 mil thickness. Samples tested at subambient and elevated temperatures were conditioned 24 hours at the testing temperature.

Fracture Toughness—($K_q$) Minicompact tension test. ASTM E-399.

Flexural Properties—ASTM D-790. Wet properties were determined in a 93° water bath after conditioning for 2 weeks at 93° C.

Glass Transition Temperature—Was determined as the maximum in the tan delta profile using a DuPont Thermal Mechanical Analyzer employing a variable frequency of 20 Hz to 12 Hz over a temperature range from 25° C. to 250° C.

The modified block copolymers used in the samples below were derived from the same base polymer, and were functionalized to different levels of carboxylic functionality. The base polymer was a polystyrene-hydrogenated polybutadiene-polystyrene block copolymer having a molecular weight of about 50,000 and a styrene content of about 30% by weight. Hydrogenation had reduced the ethylenic unsaturation to less than 1% of the original ethylenic unsaturation. The base polymer was extruder grafted with maleic anhydride in the presence of 2,5-dimethyl-2,5-(t-butylperoxy)-hexane, which is commercially available from Lucidol Pennwalt Chemicals under the trade name of Lupersol ® 101.

Modified Block Copolymers A, B, C and D were prepared having 0.3, 1.0, 1.8 and 3.5 percent by weight anhydride functionality respectively based on the functionality as anhydride. The levels of functionality were varied by varying the amount of maleic anhydride combined with the base polymer with the exception of Modified Block Copolymer D. Copolymer D was prepared by processing Modified Block Copolymer C again under conditions identical to those for the initial functionalization of Modified Block Copolymer C. The functionalization represents about 1.5, 5.2, 9.4 and 18.2 moles of anhydride functionality per mole of Modified Block Copolymers A, B, C and D respectively.

EXAMPLE 1

Preparation of Block Copolymer/Epoxy Resin Blend

Seven epoxy blends containing modified block copolymers were prepared along with one epoxy blend which did not contain modified block copolymer. Epoxy blend compositions E through L were prepared with a glycidyl ether of bisphenol A. Blend compositions E through K were prepared using a solvent free melt mixing technique. Blend L did not contain any modified hydrogenated block copolymer. The epoxy resin was first heated in a model L2 Silverson mixer-/emulsifier at 130° C. and at a mixer speed of 2500 rotations per minute (rpms). For Blends E through J, pellets of modified block copolymer having an average diameter of about 0.1 inches were then added to the epoxy resin. For Blend K, a cryogenically ground powder of modified block copolymer was utilized instead of the pellets. The temperature of the blends was then increased to 150° C. and the mixer speed increased to 4500 rpms. The epoxy resin and modified block copolymer were contacted and mixed in this Silverson mixer/emulsifier until a drastic increase in the air driven mixer speed was observed indicating that the rubber was adequately dispersed in the resin. This required about 5 to 15 minutes. The blend was then subjected to continual mixing for approximately 30 minutes during which time the temperature of the blend was increased to about 190°–200° C. and the mixer speed increased to 7000 rpm. The blend was then degassed at 125° C. under a vacuum of 30 mmHg absolute pressure.

Blend compositions E, F, and G contained 5, 10 and 15 wt % modified block copolymer C respectively and were prepared in this manner. By weight percent, it is meant total weight of modified hydrogenated block copolymer based on the amount of epoxy resin and modified block copolymer. Compositions H, I, J and K contain 10 wt % modified block copolymer A, B, D and C respectively.

The cryogenically ground powder utilized in blend K was obtained by freezing pellets of modified copolymer C under liquid nitrogen and then cryogenically grinding the frozen pellets to a powder. The powder was sieved and particles of an 80 mesh size and smaller were used.

The contents of each of these blends are summarized in Table 1.

TABLE 1

| Epoxy Blend Composition | Block Copolymer | wt % Block Copolymer | Functionality Block Copolymer | Form of Polymer |
|---|---|---|---|---|
| E | C | 5 | 1.8 | Pellets |
| F | C | 10 | 1.8 | Pellets |
| G | C | 15 | 1.8 | Pellets |
| H | A | 10 | 0.3 | Pellets |
| I | B | 10 | 1.0 | Pellets |
| J | D | 10 | 3.5 | Pellets |
| K | C | 10 | 1.8 | Powder |
| L | — | — | — | — |

EXAMPLE 2

Effect of Modified Hydrogenated Block Copolymer Addition on Thermal and Mechanical Properties of Epoxy Compositions Example 2 compares flexural modulus, fracture toughness, and glass transition temperature of cured molded specimens of ten epoxy compositions, compositions O through X. These compositions have varying curing agents, modified block copolymer content, and amount of modified block copolymer. Epoxy blend compositions E through J and L, from Example 1, were utilized. Two curing agents, Curing Agent M and Curing Agent N, were utilized. Curing Agent M was diaminodiphenyl sulfone in a powder form, which was incorporated into the compositions by dissolving the powder in an aliquont of the epoxy composition which was agitated and held at 125° C. Dissolving the powder required about one hour. Compositions containing Curing Agent M (Compositions O through Q) were cured at 125° C. for 5 hours and then 1 hour at 200° C. Curing Agent N was an eutectic mixture of aromatic amines which was in a liquid form when heated to 80° C. Compositions containing Curing Agent N (Compositions R though X) were cured at 80° C. for four hours and then 150° C. for 2 hours. The contents of Compositions O through X are summarized Table 2 along with the measured properties.

TABLE 2

| Composition | Block Copolymer | | | Tg (°C.) | Kq [psi(inch$^{\frac{1}{2}}$)] | Flexural Modulus | | Water Absorption (%) |
| | Epoxy Blend | Functionality Content | Curing Agent | Block Copolymer (wt %) | | | Dry (ksi) | Wet (ksi) | |
|---|---|---|---|---|---|---|---|---|---|
| O | L | — | M | 0 | 198 | 580 | 470 | 350 | 2.4 |
| P | E | 1.8 | M | 5 | 202 | 1045 | 385 | 280 | 2.3 |
| Q | F | 1.8 | M | 10 | 198 | 1115 | 350 | 240 | 2.2 |
| R | L | — | N | 0 | 186 | 800 | 425 | 290 | 1.8 |
| S | E | 1.8 | N | 5 | 185 | 875 | 450 | 265 | 2.1 |
| T | F | 1.8 | N | 10 | 187 | 1100 | 345 | 215 | 2.1 |
| U | G | 1.8 | N | 15 | 179 | 1330 | 310 | — | — |
| V | H | 0.3 | N | 10 | 188 | 1070 | 300 | — | — |
| W | I | 1.0 | N | 10 | 189 | 1030 | 305 | — | — |
| X | J | 3.5 | N | 10 | 188 | 1005 | 330 | — | — |

As is apparent from the data summarized in Table 2, incorporation of the modified block copolymer into the epoxy resin composition significantly improves the fracture toughness while maintaining a glass transition temperature similar to the unmodified control. All of the compositions containing modified block copolymer resulted in a reduction of flexural modulus compared to the unmodified control. Moreover, for both the modified and the unmodified blends, the flexural properties in the hot/wet state are reduced. However, the percent retention of these properties between the dry and wet state was equivalent to the unmodified control and all samples absorbed equivalent amounts of water upon conditioning.

It is also apparent from this example that the retention of thermal properties with a corresponding increase in toughness may be achieved using block copolymer containing an effective amount of functional groups (at least 2 per molecule). Moreover these property improvements are realized with each of two curing agents.

EXAMPLE 3

Effect of Curing Agent Addition

In Example 3, the flexural modulus in the dry state, the fracture toughness and the glass transition temperature were determined for cured epoxy compositions containing varying amounts of Curing Agent N. Cured plaques were prepared as outlined in Example 2. Compositions Y and Z were prepared from epoxy blends L and F respectively with 75% of stoichiometric amount of Curing Agent N. Epoxy blend L did not contain any modified hydrogenated block copolymer whereas epoxy blend F contained 10% by weight of modified hydrogenated block copolymer C. Compositions AA and BB were prepared from epoxy blends L and F respectively using 125% of a stoichiometric amount of Curing Agent N. The contents and properties of these compositions are summarized in Table 3. Compositions R and T were prepared from epoxy blends L and F respectively using 100% of a stoichiometric amount of Curing Agent N, in Example 2. The compositions and properties are included in Table 3 for convenience.

As shown in Table 3, the maximum glass transition temperature is observed at 100% stoichiometry. However, excess curing agent results in a dramatic improvement in fracture toughness for the modified blend compared to the unmodified control. Moreover, the toughness improvement observed in the modified epoxy composition is achieved without altering the glass transition temperature when compared to the unmodified control.

causes an increase in the lap shear strength at all temperatures compared to the unmodified control.

From the data comparing the modified block copolymer C added in the pellet versus the powder form, the blend composition containing pellets (EE) show superior performance when compared to the blend composition containing the powder (FF), the blend composition utilizing powder form modified block copolymer having lap shear adhesion strengths which are similar to the unmodified control (CC). Morphological analysis showed that the powder agglomerates during mixing forming particles with an undesirably large mean particle size.

The effect of the curing agent stoichiometric ratio on lap shear strengths can be seen by comparing lap shear strengths of compositions HH to EE, and KK to JJ in Table 4. An excess of curing agent further improves the lap shear strengths of epoxy resin-modified hydrogenated block copolymer compositions.

Although Applicant is not bound by theory, it is believed that the improved high temperature and room temperature lap shear strengths are a result of increasing the toughness of the epoxy compositions while maintaining the glass transition temperature of the unmodified epoxy. Typically, tougher epoxies of the prior art have lower glass transition temperatures, and therefore typically are not expected to have improved lap shear strengths in particular at elevated temperatures.

TABLE 3

| Composition | Epoxy Blend Composition | % w Block Copolymer In Blend | Curing Agent | Stoichiometric* Ratio | Tg (°C.) | Kq [psi (inch)$^{\frac{1}{2}}$] |
|---|---|---|---|---|---|---|
| Y | L | 0 | N | 75% | 151 | 510 |
| Z | F | 10 | N | 75% | 147 | 1380 |
| R | L | 0 | N | 100% | 186 | 800 |
| T | F | 10 | N | 100% | 187 | 1100 |
| AA | L | 0 | N | 125% | 158 | 900 |
| BB | F | 10 | N | 125% | 154 | 1930 |

*Percentage of amine groups of curing agent based on epoxy groups in resin.

TABLE 4

| Lap Shear Composition | Blend Composition | Curing Agent | Stoichiometric Ratio of Curing Agent | wt % Block Copolymer | Functionality Content wt % | Block Copolymer Form | Lap Shear Strength (psi) | | |
|---|---|---|---|---|---|---|---|---|---|
| | | | | | | | −50° C. | RT | 150° C. |
| CC | L | N | 100% | 0 | — | — | 2224 | 2366 | 1852 |
| DD | H | N | 100% | 10 | 0.3 | pellets | 1904 | 1617 | 1770 |
| EE | F | N | 100% | 10 | 1.8 | pellets | 2505 | 2792 | 2377 |
| FF | K | N | 100% | 10 | 1.8 | powder | 2286 | 2206 | 2077 |
| GG | L | N | 125% | 0 | — | — | — | 2137 | — |
| HH | F | N | 125% | 10 | 1.8 | pellets | — | 3064 | — |
| II | J | N | 100% | 10 | 3.5 | pellets | 2710 | 2545 | 2103 |
| JJ | G | N | 100% | 15 | 1.8 | pellets | — | 3178 | — |
| KK | G | N | 125% | 15 | 1.8 | pellets | — | 3457 | — |

EXAMPLE 4

Lap Shear Properties

Several lap shear specimens were prepared with epoxy compositions in accordance with ASTM D-1002. Compositions CC through KK were prepared from the epoxy blends and curing agents listed in Table 4. These compositions were cured using Curing Agent N for 2 hrs. at 80° C. and 3 hrs. at 150° C. After curing, the stress required to separate the aluminum substrates was measured at −50° C., room temperature and at 150° C. for each composition.

Comparing properties of Composition EE to properties of Composition CC demonstrates that incorporating the modified block copolymer C in the pellet form

We claim:
1. A process to produce an epoxy resin composition comprising the steps of:
   a) providing from 1 to about 100 parts by weight of pellets having an average particle size with the range of 0.05 in. to 0.3 in. of modified hydrogenated block copolymer comprising at least one block comprising predominantly polymerized monoalkenyl aromatic hydrocarbon monomer units, and at least one block comprising predominantly, before hydrogenation, polymerized conjugated diolefin monomer units, the hydrogenated block copolymer having been modified by grafting substantially to the blocks of polymerized conjugated diolefin monomer units, on the average, between about 2 and about 200 maleic anhydride functional groups for each polymer molecule of modified hydrogenated block copolymer;
   b) melt blending the modified hydrogenated block copolymer with 100 parts by weight of an epoxy resin;
   c) agitating the blend by high shear mixing under conditions sufficient to react an amount of the maleic anhydride functional group with epoxy groups of the epoxy resin effective to provide a stable dispersion of modified hydrogenated block copolymer in the epoxy resin;

d) recovering an epoxy resin composition; and e) adding a curing agent to the epoxy composition.

2. The process of claim 1 further comprising the step of curing the epoxy resin-curing agent composition.

3. The process of claim 1 wherein the monoalkenyl aromatic hydrocarbon is styrene.

4. The process of claim 1 wherein the conjugated diolefin is butadiene.

5. The process of claim 1 wherein the conjugated diolefin is isoprene.

6. The process of claim 1 wherein the modified hydrogenated block copolymer is hydrogenated so that at least 80% of the ethylenic unsaturation initially contained therein is hydrogenated.

7. The process of claim 1 wherein more than about 90% of the initial aromatic unsaturation remains unsaturated after hydrogenation.

8. The process of claim 1 wherein the epoxy resin may be represented by the general formula:

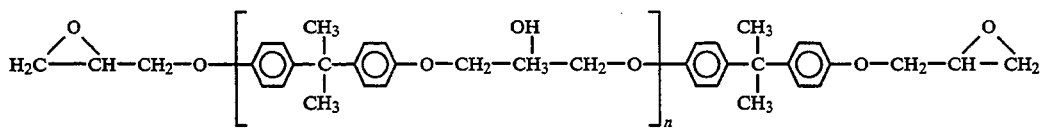

wherein
n is a number from 0 to about 6.

9. The process of claim 1 wherein the epoxy resin is a liquid epoxy resin.

10. The process of claim 8 wherein n is about 0.2.

11. The process of claim 1 wherein the amount of curing agent is from 100 to 150 percent of the stoichiometric ratio of curing agent functional groups to epoxy groups in the epoxy resin.

12. The process of claim 1 wherein about 125% of a stoichiometric amount of curing agent is added to the epoxy composition.

13. The process of claim 1 wherein the conditions sufficient to react an amount of the maleic anhydride functional groups with epoxy groups include holding at a temperature above 150° C. for greater than 15 minutes.

14. The process of claim 1 wherein the conditions sufficient to react an amount of the maleic functional groups with epoxy groups include holding at a temperature above 150° C. for greater than about 1 hour.

15. The process of claim 1 wherein the modified hydrogenated block copolymer is a modified polystyrene-hydrogenated polyisoprene diblock copolymer.

16. The process of claim 1 wherein the modified hydrogenated block copolymer is a modified polystyrene-hydrogenated polybutadiene-polystyrene triblock copolymer.

17. The process of claim 1 wherein the cured epoxy resin composition has room temperature lap shear adhesion to an anodized aluminum substrates in excess of 2400 psi.

18. The product of the process of claim 1.

19. The process of claim 1 wherein the amount of the maleic anhydride functional groups in step (c) is substantially all of the maleic anhydride functional groups.

* * * * *